(12) United States Patent
Whitens et al.

(10) Patent No.: US 9,586,552 B1
(45) Date of Patent: Mar. 7, 2017

(54) VEHICLE SEAT BACK INCLUDING A DEPLOYABLE DEVICE

(71) Applicant: Ford Global Technologies, LLC, Dearborn, MI (US)

(72) Inventors: Michael James Whitens, Milford, MI (US); Dean M. Jaradi, Macomb, MI (US); Iskander Farooq, Novi, MI (US); Mohammed Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/926,492

(22) Filed: Oct. 29, 2015

(51) Int. Cl.
*B60R 21/207* (2006.01)
*B60R 21/2165* (2011.01)
*B60R 21/00* (2006.01)
*B60R 21/231* (2011.01)

(52) U.S. Cl.
CPC ........ *B60R 21/207* (2013.01); *B60R 21/2165* (2013.01); *B60R 2021/0048* (2013.01); *B60R 2021/23153* (2013.01)

(58) Field of Classification Search
CPC .............. B60R 21/207; B60R 21/2165; B60R 2021/0048; B60R 2021/23153; B60R 2021/2072; B60R 2021/2076; B60R 2021/2078; B60R 2021/0407
See application file for complete search history.

(56) References Cited

U.S. PATENT DOCUMENTS

| | | | | |
|---|---|---|---|---|
| 3,514,124 A * | 5/1970 | Richardson | ........... | B60R 21/205 280/728.1 |
| 5,975,565 A * | 11/1999 | Cuevas | ................. | B60N 2/433 280/728.2 |
| 6,149,231 A * | 11/2000 | Wustholz | ................. | B60N 2/48 280/730.1 |
| 6,196,576 B1 * | 3/2001 | Sutherland | ........... | B60N 2/4829 280/730.1 |
| 6,199,900 B1 | 3/2001 | Zeigler | | |
| 6,557,887 B2 | 5/2003 | Wohllebe | | |
| 8,523,220 B1 * | 9/2013 | Gehret | ................... | B64D 11/06 244/118.5 |
| 9,308,882 B2 * | 4/2016 | Nagasawa | ............. | B60R 21/013 |
| 2001/0015548 A1 | 8/2001 | Breed et al. | | |
| 2004/0164529 A1 * | 8/2004 | Yoshida | ............... | B60N 2/2806 280/730.2 |
| 2004/0251721 A1 * | 12/2004 | Yoshida | ............... | B60N 2/2851 297/250.1 |

(Continued)

FOREIGN PATENT DOCUMENTS

DE 2841729 4/1980

*Primary Examiner* — Drew Brown
(74) *Attorney, Agent, or Firm* — Frank A. MacKenzie; Bejin Bieneman PLC

(57) ABSTRACT

A seat back for a vehicle includes a frame and a deployable device. The deployable device includes a back panel fixed to the frame, a front panel opposite the back panel, and a cavity between the back panel and the front panel. The seat back includes an inflator in communication with the cavity of the deployable device. The deployable device is formed of a plastic material. During a frontal impact of the vehicle, the deployable device may be inflated from an undeployed position to a deployed position to absorb impact from an occupant of the vehicle.

20 Claims, 9 Drawing Sheets

(56) References Cited

U.S. PATENT DOCUMENTS

| | | | |
|---|---|---|---|
| 2005/0023806 A1* | 2/2005 | Higuchi | B60R 21/231 280/730.1 |
| 2009/0152848 A1* | 6/2009 | Sadr | B60N 2/4415 280/730.2 |
| 2013/0341975 A1* | 12/2013 | Schneider | B64D 11/06 297/163 |

* cited by examiner

US 9,586,552 B1

VEHICLE SEAT BACK INCLUDING A DEPLOYABLE DEVICE

BACKGROUND

An interior of a vehicle, such as automobile, typically includes energy absorbers for absorbing energy from an occupant of the vehicle during an impact of the vehicle. For example, a seat of the vehicle may include one or more energy absorbers. These energy absorbers may be passive, e.g., not activated before impact, or may be active, e.g., deployed when impact is sensed. Active energy absorbers are desired for some applications in the interior of the vehicle, e.g., a seat back of the vehicle. However, space within the interior of the vehicle is limited and, as such, it is desirable to design components of the seat to be as small as possible. There remains an opportunity to design an active energy absorber for the seat with a reduced size before deployment.

DETAILED DESCRIPTION

Figure 1:
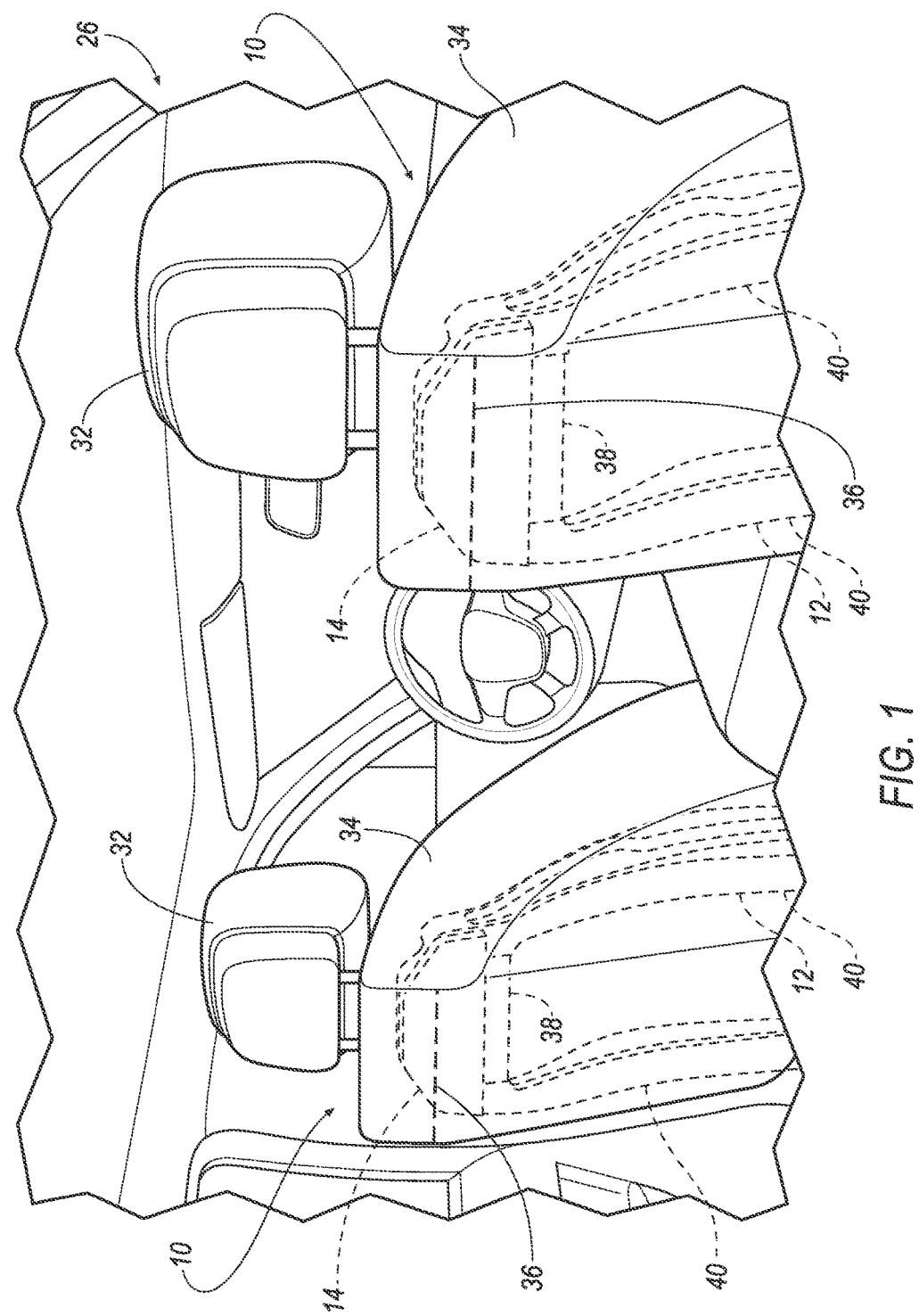
FIG. 1 is a perspective view of a portion of a vehicle including seat backs each with a deployable device in an undeployed position and a frame shown in hidden lines.

With reference to the Figures, wherein like numerals indicate like parts throughout the several views, a seat back 10 for a vehicle 26 includes a frame 12 and a deployable device 14. The deployable device 14 includes a back panel 16 fixed to the frame 12, a front panel 18 opposite the back panel 16, and a cavity 20 between the back panel 16 and the front panel 18. The seat back 10 includes an inflator 24 in communication with the cavity 20. The deployable device 14 is formed of a plastic material, such as thermoplastic elastomer (TPE), polypropylene (PP), etc.

With reference to FIGS. 1-8, properties of the plastic material of the deployable device 14 allows the deployable device 14 to be shaped to follow contours of the frame 12, thus providing connection points to fix the back panel 16 to the frame 12. As set forth below, the plurality of connection points may reduce or eliminate the need for specialized brackets to fix the deployable device 14 to the frame 12. The manufacturing flexibility afforded by the plastic material may allow the deployable device 14 to be formed, e.g., blow molded, injection molded, etc., into any suitable shape and size, which may allow the thickness of the deployable device 14 in an undeployed position, as shown in FIGS. 1, 2A and 3A, to be minimized relative to the frame thickness. Accordingly, the deployable device 14 may be integrated into existing seat back designs without the need for major structural alterations, which may reduce development time and cost.

Figure 2A:
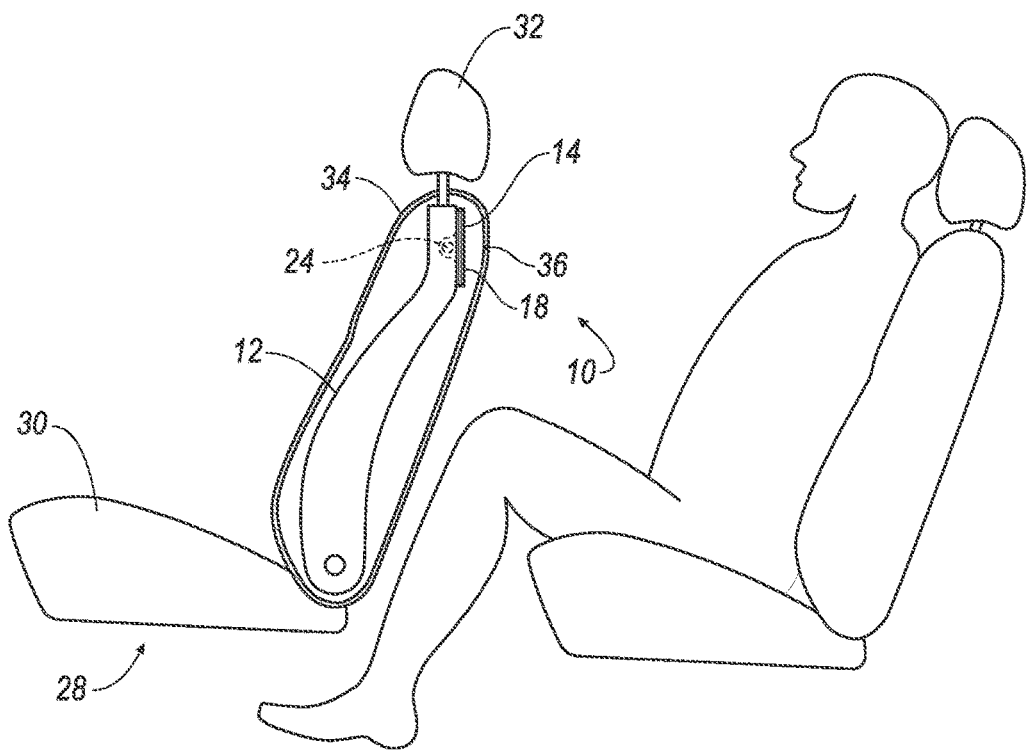
FIG. 2A is a side view the seat back, shown partially in cross-section, with the deployable device in the undeployed position.
Figure 2B:
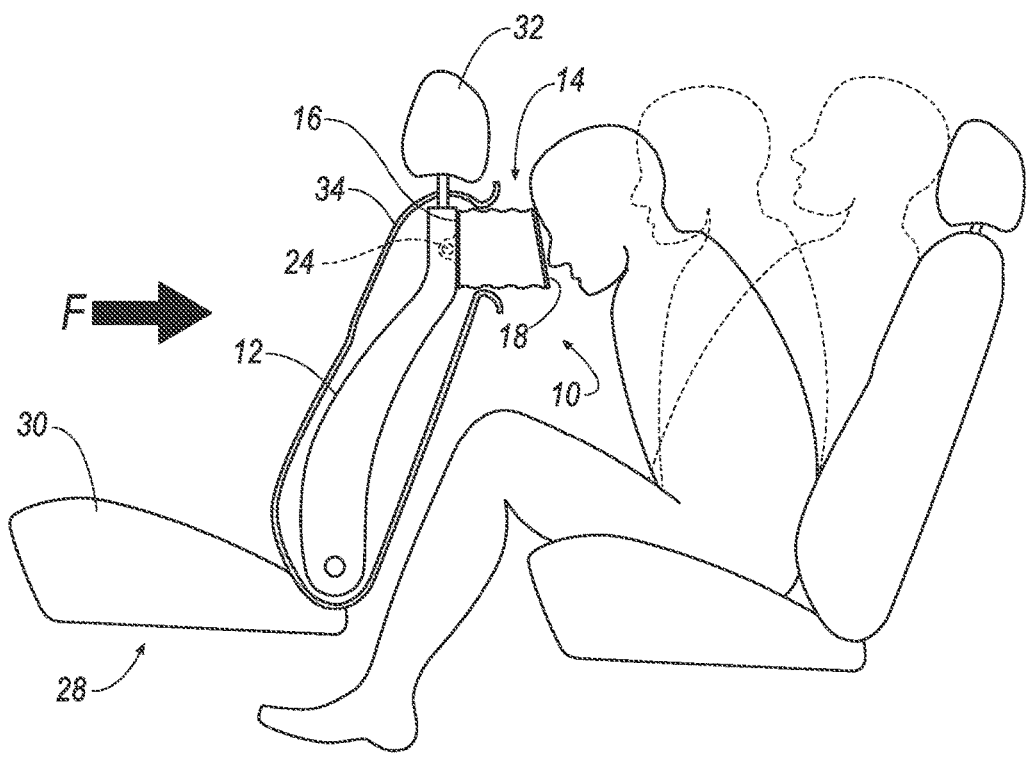
FIG. 2B is the side view of FIG. 2A with the deployable device in a deployed position.

As shown in FIGS. 2A-2B, an occupant may be seated behind the seat back 10, and may move toward the seat back 10 in a forward and/or downward motion, for example, during a frontal impact of the vehicle 26 (identified with "F" in FIG. 2B). As the occupant, e.g., a head of the occupant, moves toward the seat back 10, the deployable device 14 disposed in the seat back 10 in the undeployed position, as shown in FIG. 2A, may be selectively inflated to a deployed position, as shown in FIG. 2B. In this situation, as the occupant continues to move in a forward and/or downward motion, the deployable device 14 in the deployed position cushions the occupant and may reduce the likelihood and/or magnitude of impact energy transferred to the occupant.

The deployable device 14 may be a component of an impact absorbing system 22. The impact absorbing system 22 may include the inflator 24 in communication with the cavity 20 of the deployable device 14. Specifically, as set forth further below for example, the impact absorbing system 22 may sense an impact of the vehicle 26 and may trigger inflation of the deployable device 14 in response to the sensed impact. In addition, the impact absorbing system 22 may sense the type of impact, e.g., based on direction, magnitude, etc., and may trigger inflation of the deployable device 14 in response to the type of impact.

With reference to FIGS. 1-3B, the vehicle 26 may include a seat assembly 28. The seat assembly 28 may include the seat back 10, a seat bottom 30, and a headrest 32. The headrest 32 may be supported by the seat back 10, and may be stationary or moveable relative to the seat back 10. The seat back 10 may be supported by the seat bottom 30, and may be stationary or moveable relative to the seat bottom 30.

With reference to FIGS. 1-2B, the vehicle 26 may include a front seat and a rear seat, and the deployable device 14 may be supported by the seat back 10 of the front seat. The vehicle 26 may include any suitable number of seats, i.e., one or more. The vehicle 26 may include any suitable number of rows of seats in any suitable position, e.g., a front row, a middle row (not shown), a rear row, etc. In any event, one or more deployable devices 14 may be supported by one or more of the seat backs 10. The vehicle 26 may be of any suitable type, e.g., a car, truck, SUV, etc.

As shown in FIG. 1, the seat back 10 may include trim 34 supported by the frame 12. At least a portion of the trim 34 may define a tear seam 36 to allow the deployable device 14 to inflate through the trim 34 to the deployed position. The tear seam 36 may be a cut and/or weakened area of the trim 34. The trim 34 may be formed of any suitable material such as a polymer, e.g., nylon, plastic, foam, polypropylene (PP), acrylonitrile butadiene styrene (ABS), vinyl, etc.

In the alternative to being covered by the trim 34, the front panel 18 may have a class-A surface, i.e., a surface specifically manufactured to have a high quality, finished aesthetic appearance free of blemishes. The class-A surface may have any suitable surface texture. For example, the class-A surface may be smooth. As another example, the class-A surface may be grained, e.g., to simulate the appearance of leather. In addition to the surface texture, the class-A surface may have any suitable color hue and pattern, e.g., solid, grained, etc.

Figure 3A:
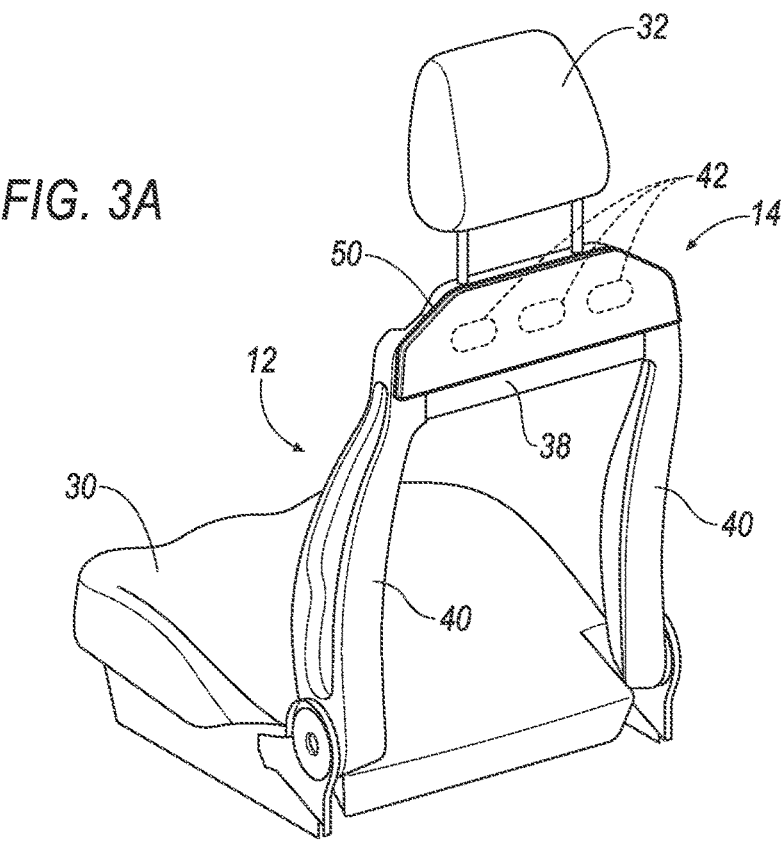
FIG. 3A is a perspective view of the frame with the deployable device in the undeployed position.
Figure 8:
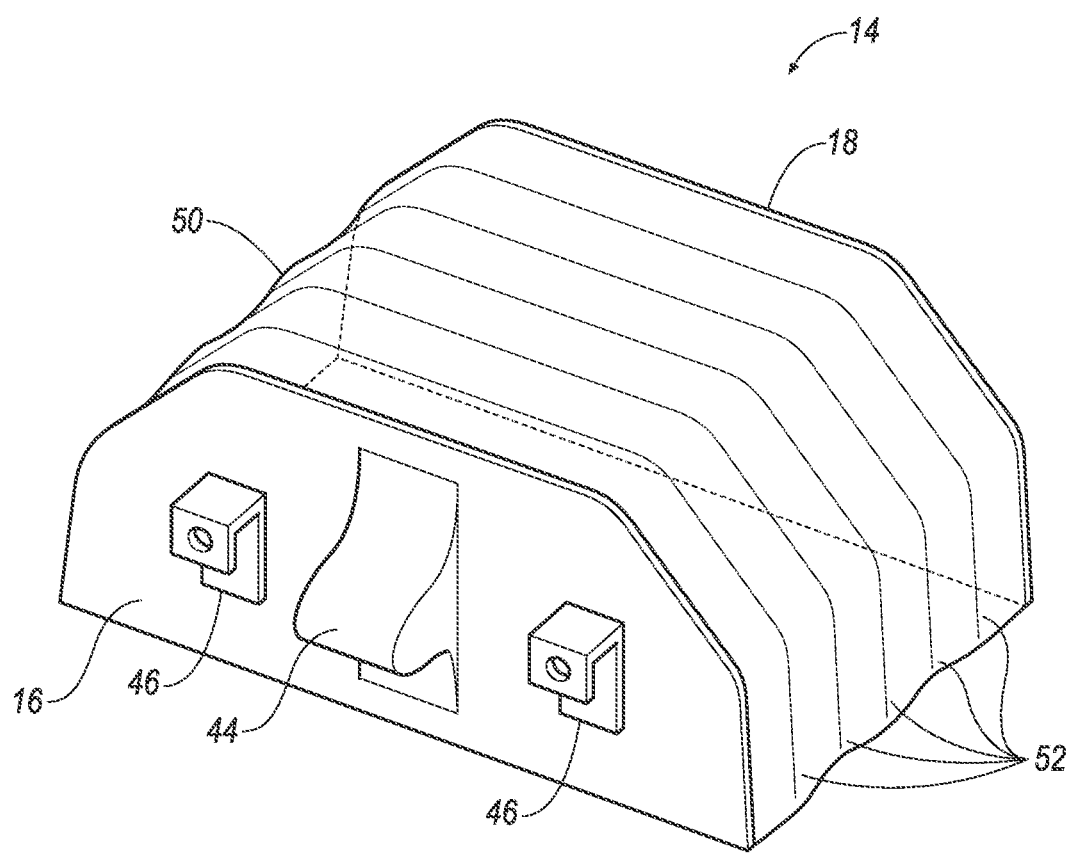
FIG. 8 is a perspective view of another embodiment of the deployable device in the deployed position with the housing including hooks for mounting to the frame.

With reference to FIG. 3A the frame 12 may include an upper member 38 and two side members 40. The frame 12 may include additional members (not shown). The side members 40 may be integral with the upper member 38, i.e., formed simultaneously as a single continuous frame 12. Alternatively, the side members 40 and the upper member 38 may be formed separately and subsequently welded together, e.g., arc welded, ultrasonic welded, etc. The upper member 38 may include orifices 42 to receive a housing 44 of the deployable device 14 and/or clips 46, as shown in FIG. 8 and as discussed further below. The orifices 42 may be elongated, i.e., may be slots. The upper member 38 may also include bores to support the headrest 32, as shown in FIGS. 2A-3B.

The frame 12, e.g., the upper member 38 and/or the side members 40, may be formed of any suitable plastic material, e.g., carbon fiber reinforced plastic (CFRP), glass fiber-reinforced semifinished thermoplastic composite (organosheet), etc. Alternatively, for example, the upper member 38 and side members 40 may be formed of a suitable metal, e.g., steel, aluminum, etc.

The back panel 16 of the deployable device 14 may be fixed to the frame 12. Specifically, the back panel 16 may be fixed to the upper member 38. In addition, or in the alternative, the back panel 16 may be fixed to the side members 40. For example, the deployable device 14 may be bonded, i.e., welded or adhered, to the frame 12.

The deployable device 14 may be bonded to the frame 12 in any suitable fashion. For example, where the frame 12 is formed of a plastic material, as set forth above, the back panel 16 may be welded, e.g., ultrasonically welded, to the frame 12. As another example, where the frame 12 is formed of plastic, the back panel 16 may be adhered, to the frame 12 with structural adhesives, for example, epoxy adhesive, acrylic adhesive, etc. As another example, where the frame 12 is formed of metal, the back panel 16 may be adhered to the frame 12 with epoxy adhesive, acrylic adhesive, etc. As yet another example, the back panel 16 may be both adhered and welded to the frame 12, e.g., for a hybrid frame 12 formed of multiple material types. In any event, the weld and/or adhesive is configured to hold the back panel 16 of the deployable device 14 to the frame 12 in both the undeployed position and the deployed position.

In addition to, or in the alternative to bonding the deployable device 14 to the frame 12, the clips 46 may be fixed to the back panel 16 and to the frame 12. Specifically, the deployable device 14 may include a plurality of clips 46, as shown in FIG. 8. The clips 46 may fix the back panel 16 to the frame 12. Specifically, the back panel 16 may be fixed to the upper member 38. The upper member 38 may include any suitable feature for engaging the clips 46. For example, as set forth above, the upper member 38 may include the orifices 42 for receiving the clips 46.

Figure 3B:
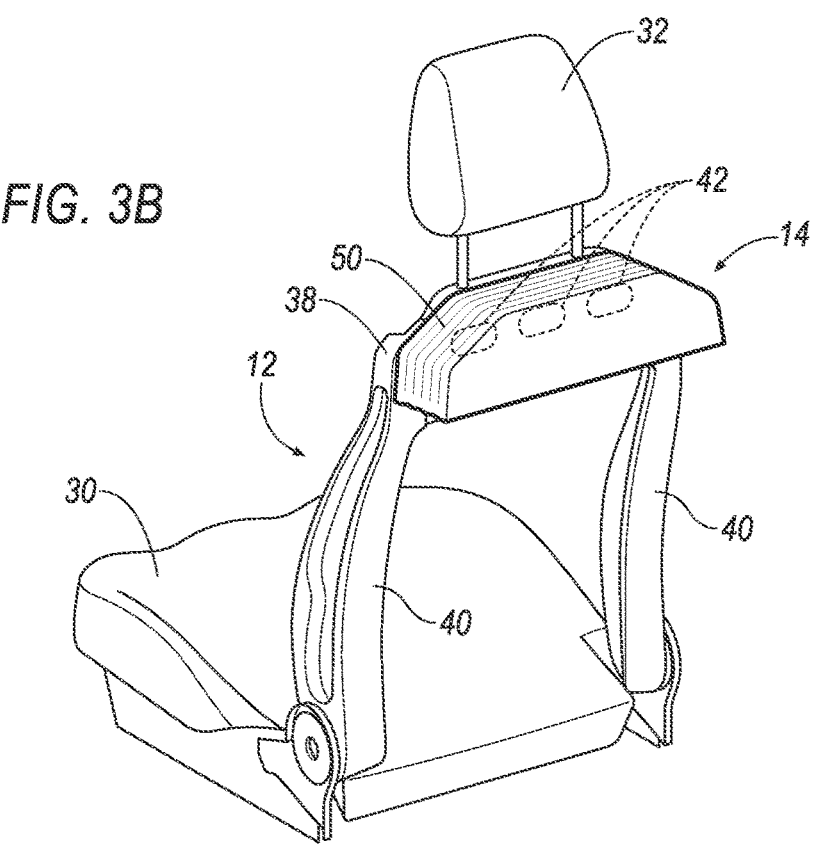
FIG. 3B is the perspective view FIG. 3A with the deployable device in the deployed position.
Figure 4:
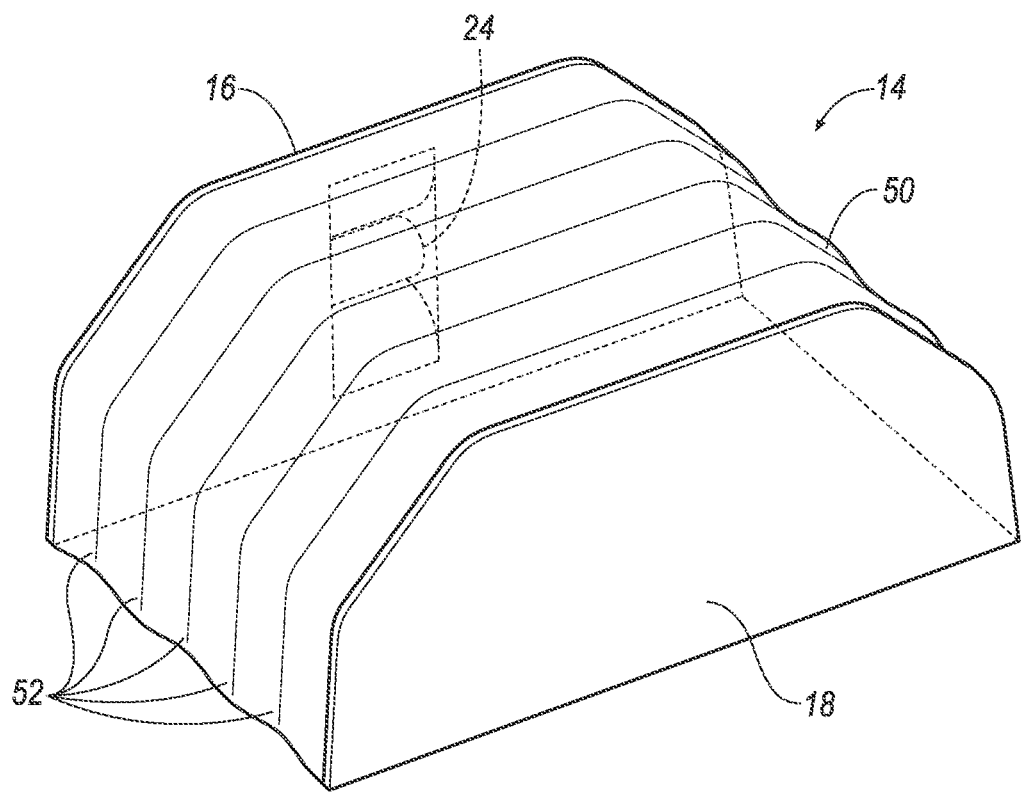
FIG. 4 is a perspective view of the deployable device in the deployed position with a housing and an inflator shown in hidden lines.
Figure 5:
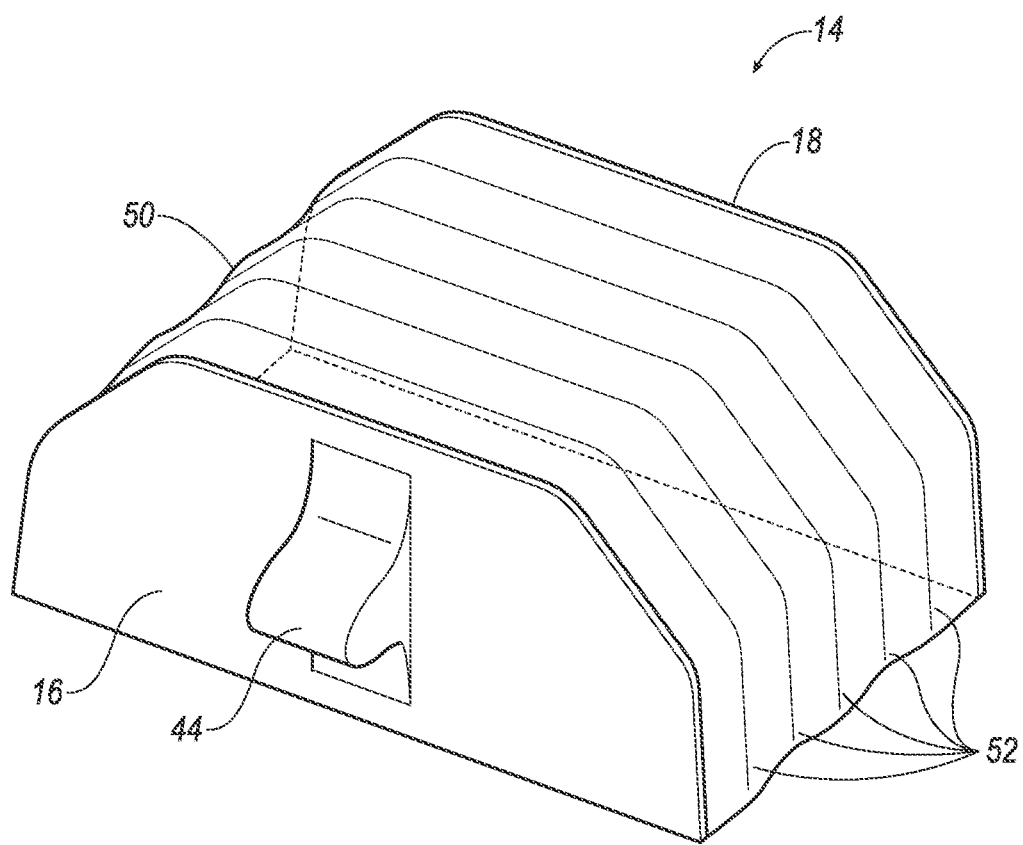
FIG. 5 is another perspective view of the deployable device in the deployed position.

Specifically, the orifices 42 of the upper member 38, as shown in FIG. 3A-3B, may receive the clips 46 in order to properly position the deployable device 14 before the back panel 16 is welded or adhered to the frame 12 as set forth above. Alternatively, or in addition, the clips 46 may fix the back panel 16 to the frame 12 in the absence of bonding. In this case, the orifices 42 of the upper subframe 12 receive the clips 46, and the clips 46 may be fixed to the upper member 38, for example, by fasteners, rivets, threaded screws, adhesion, welding, heat staking, etc.

The clips 46 may be integrally formed with the back panel 16, i.e., formed simultaneously as a single continuous unit. For example, the clips 46 and the back panel 16 may be blow molded from the same piece of material. Alternatively, the clips 46 and the back panel 16 may be formed separately and subsequently fixed together, e.g., welded, adhered, etc. The separately formed clips 46 may be formed of any suitable material, e.g., metal, such as steel, aluminum, etc., plastic such as acrylonitrile butadiene styrene (ABS), polyvinyl chloride (PVC), etc.

The clips 46 may be of any suitable configuration and the clips 46 may have the same or different configurations as each other. For example, one or more of the clips 46 may include a hooked end 48, as shown in FIG. 8. The hooked end 48 may be configured to engage one of the orifices 42 of the frame 12 of the seat back 10. In this case, the hooked end 48 may be fixed to the frame 12, for example, by fasteners, rivets, threaded screws, adhesion, welding, heat staking, etc. As another example, one or more of the clips 46 may include a resilient member (not shown). The resilient member may be configured to engage one of the orifices 42 of the frame 12 of the seat back 10. The resilient member may, for example, be a Christmas tree fastener, or any other suitable type of resilient member.

Figure 6A:
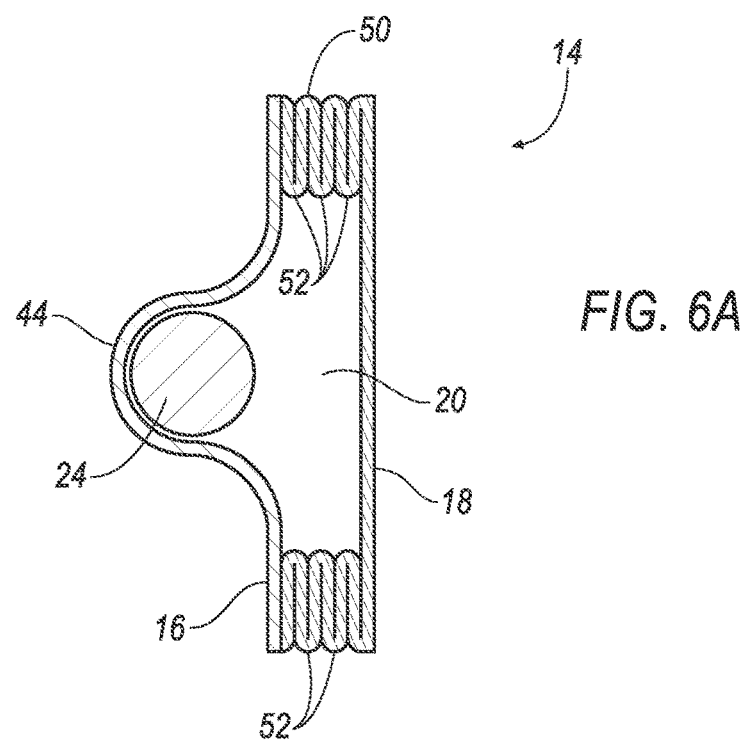
FIG. 6A is a cross-sectional view of the deployable device in the undeployed position.
Figure 6B:
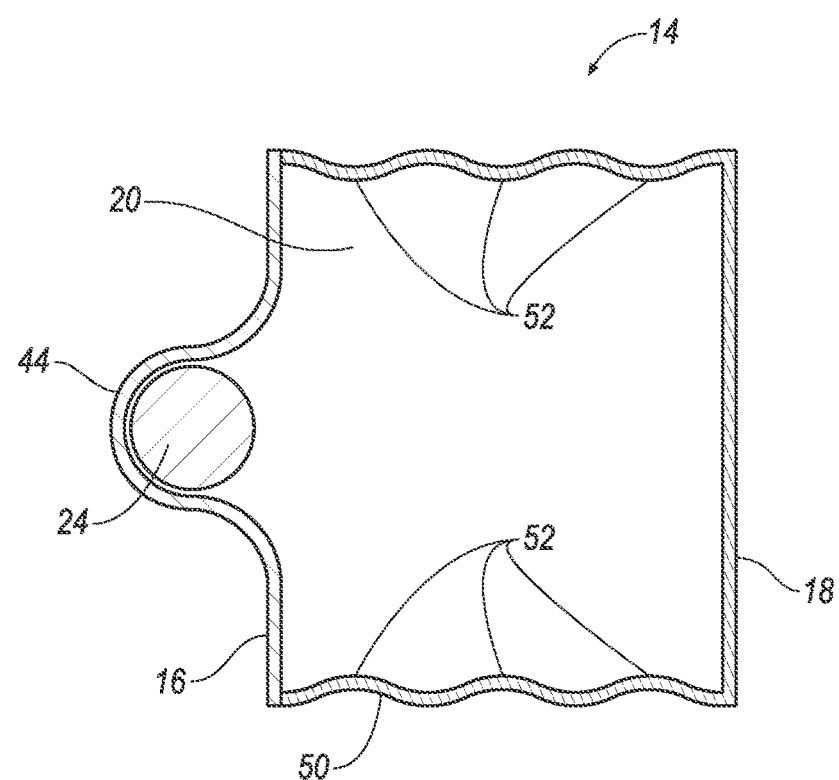
FIG. 6B is a cross-sectional view of the deployable device in the deployed position.

With reference to FIGS. 6A-6B, the front panel 18 is opposite the back panel 16 with the cavity 20 disposed therebetween. As shown in FIGS. 1-2A, the front panel 18 in the undeployed position is adjacent to the trim 34 and the tear seam 36. As the deployable device 14 inflates, the front panel 18 pushes against the trim 34 and the tear seam 36 when the deployable device 14 is inflated from the undeployed position to the deployed position, as shown in FIG. 2B. As the deployable device 14 inflates, the trim 34 at the tear seam 36 tears and forms flaps to allow the front panel 18 to extend out from the seat back 10. The front panel 18 may be adjacent the trim 34 and tear seam 36 free of adhesive or other fasteners in the undeployed position, e.g., in contact with and disconnected from the trim 34 and tear seam 36 in the undeployed position.

As set forth above, the cavity 20 of the deployable device 14 may be defined to be between the front panel 18 and the back panel 16. The deployable device 14 may include an intermediate portion 50 extending from the back panel 16 to the front panel 18. The intermediate portion 50 may enclose the cavity 20 between the front panel 18 and the back panel 16. The cavity 20 may be sealed between the front panel 18, the back panel 16, and the intermediate portion 50 in an airtight fashion. Alternatively, the front panel 18, the back panel 16, and/or intermediate portion 50 may include vents or other holes (not shown) to allow cavity 20 deflation by the occupant.

As shown in FIG. 6A-6B, the intermediate portion 50 may be integral with the front panel 18 and/or the back panel 16, i.e., formed simultaneously as a single continuous unit. For example, the front panel 18, the back panel 16, and/or the intermediate portion 50 may be integrally formed by blow molding, or alternatively, may be integrally formed in any suitable fashion. In the alternative to being integrally formed, the front panel 18, the back panel 16, and/or the intermediate portion 50 may be formed separately from each other and subsequently assembled, e.g., by welding, adhering, etc.

As one example, the intermediate portion 50 and the front panel 18 may be integrally formed, e.g., by blow molding, and may be subsequently assembled to the back panel 16, e.g., by welding. As another example, the intermediate portion 50 and the back panel 16 may be integrally formed, e.g., by blow molding, and may be subsequently assembled to the front panel 18, e.g., by welding.

With reference to FIGS. 6A and 6B, the intermediate portion 50 may be folded between the front panel 18 and the back panel 16 in the undeployed position, i.e., may define one or more folds 52 between the front panel 18 and the back panel 16 in the undeployed position. As the deployable device 14 is inflated to the deployed position, the folds 52 of the intermediate portion 50 may unfold to allow the front panel 18 to move away from the back panel 16.

The folds 52 may extend along the cavity 20 between the front panel 18 and the back panel 16 and may enclose the cavity 20 between the front panel 18 and the back panel 16. The folds 52 may be integral with at least one of the back panel 16 and the front panel 18.

The plastic material of the deployable device 14 may be a thermoplastic elastomer, e.g., the front panel 18, the back panel 16, and/or the intermediate portion 50 may be formed of a thermoplastic elastomer. The thermoplastic elastomer is a polymeric material with both thermoplastic and elastomeric properties. A suitable class of TPE material may be, for example, thermoplastic olefin (TPO). The front panel 18, the back panel 16, and the intermediate portion 50 may be formed of the same type of material or may be formed of different types of material. Alternatively, the plastic material of the deployable device 14 may be of any suitable type.

In configurations where the deployable device is an elastomer, the elastomeric properties of the deployable device 14 in the deployed position may allow the front panel 18, the back panel 16, and/or the intermediate portion 50 to stretch to a size greater than their respective sizes when in the undeployed position. The stretching may be elastic and may not cause permanent deformation. The material thicknesses of each of the front panel 18, the back panel 16, and the intermediate portion 50 may be uniform, and may be between 1-3 mm.

As set forth above, the inflator 24 in communication with the cavity 20 of the deployable device 14 expands the cavity 20 with an inflation medium, such as a gas. The inflator 24 may be, for example, a pyrotechnic inflator 24 that uses a chemical reaction to drive the inflation medium to the cavity 20. Alternatively, the inflator 24 may be, for example, a cold-gas inflator 24 that, when activated, ignites a pyrotechnic charge that creates an opening for releasing the pressurized inflation medium to the cavity 20 via a fill tube. Alternatively, the inflator 24 may be of any suitable type, for example, a hybrid inflator 24.

As shown in FIGS. 4-6B, the inflator 24 may be mounted to the back panel 16, and disposed in the cavity 20. Specifically, with reference to FIGS. 4-6B, the back panel 16 may define the housing 44, and the inflator 24 may be disposed in the housing 44. The housing 44 may be integrally formed with the rest of the back panel 16. Alternatively, the inflator 24 may be mounted to the back panel 16 external to the cavity 20.

Figure 7:
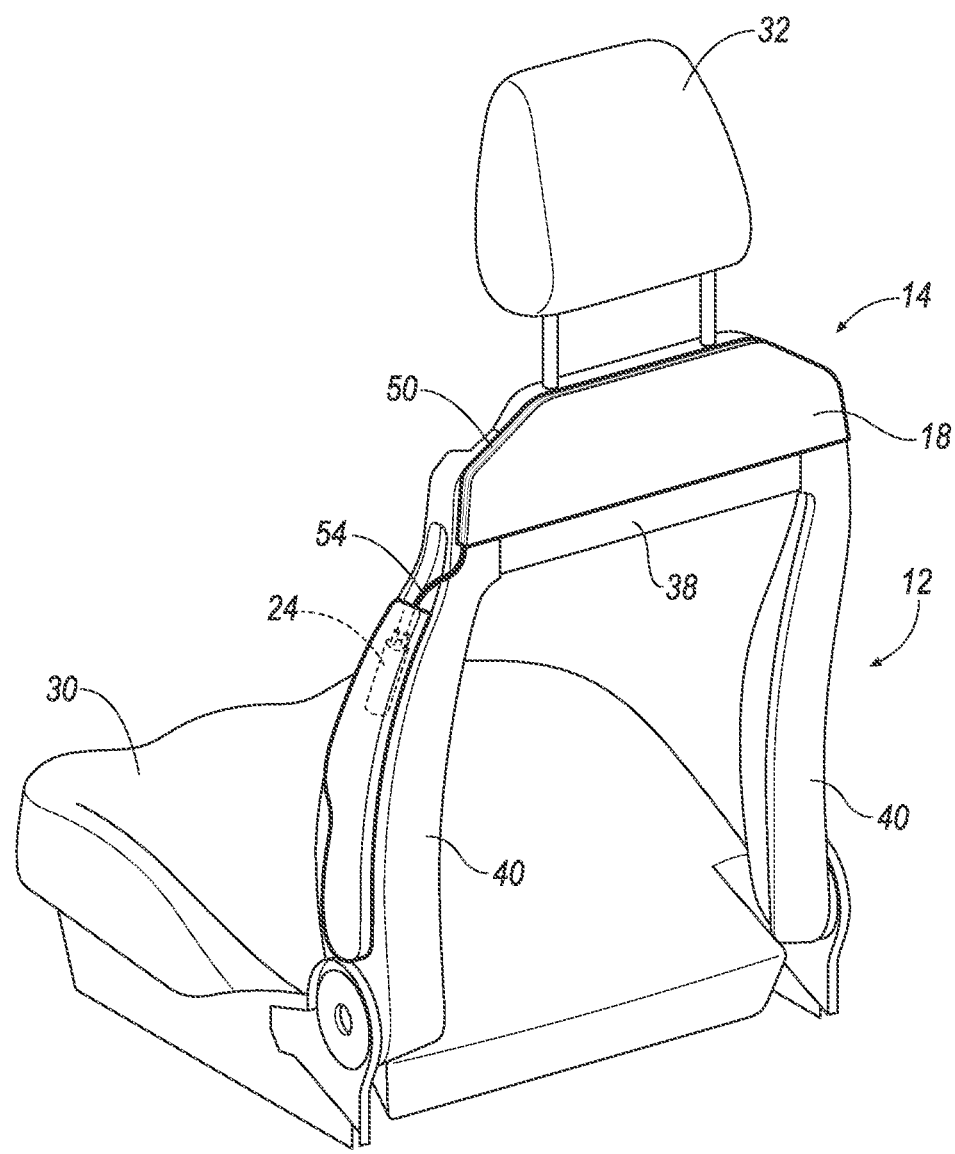
FIG. 7 is a perspective view of the frame and the deployable device in the undeployed position with the inflator mounted to the frame.

As yet another alternative, as shown in FIG. 7, the inflator 24 may be mounted to the frame 12, e.g., upper member 38, side member, etc., remote from the deployable device 14 in communication with the cavity 20 through a fill tube 54. As one example, the inflator 24 may be mounted to the frame 12 as shown and described in U.S. patent application Ser. No. 14/843,245, which is hereby incorporated by reference.

Figure 9:
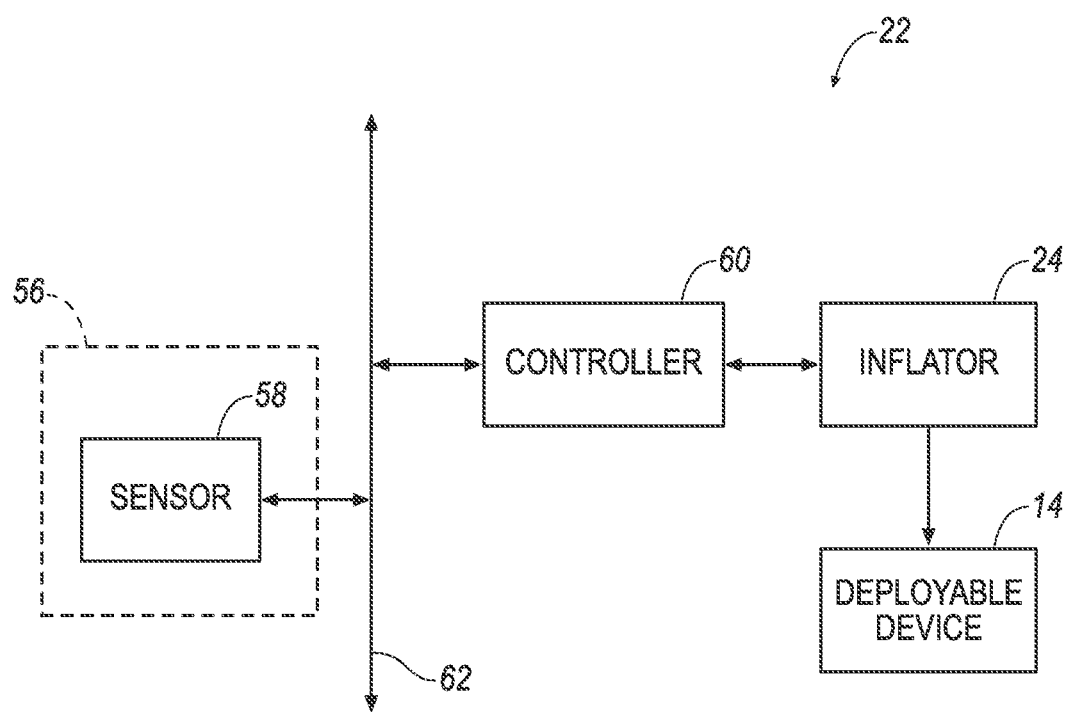
FIG. 9 is a schematic of an impact absorbing system.

With reference to FIG. 9, the vehicle 26 may include an impact sensing system 56 including at least one sensor 58 for sensing impact of the vehicle 26. The impact sensing system 56 may include a controller 60 in communication with the sensor 58 and the inflator 24 for activating the inflator 24, e.g., for providing an impulse to a pyrotechnic charge of the inflator 24, when the sensor 58 senses an impact of the vehicle 26. Alternatively or additionally to sensing impact, the impact sensing system 56 may be configured to sense impact prior to impact, i.e., pre-impact sensing. The sensor 58 may be of any suitable type, e.g., using radar, lidar, and/or a vision system. The vision system may include one or more cameras, CCD image sensors, and/or CMOS image sensor, etc.

The controller 60 may be a microprocessor-based controller. The sensor 58 is in communication with the controller 60 to communicate data to the controller 60. Based on the data communicated by the sensor 58, the controller 60 instructs the inflator 24 to activate. The controller 60 may be programmed to activate the inflator 24 to inflate the deployable device 14 to the deployed position in response at least to a front impact of the vehicle 26. Specifically, the sensor 58 may sense the front impact and, based on the sensed front impact, the controller 60 may provide an instruction to the inflator 24 to inflate the deployable device 14. The controller 60 and the sensor 58 may be connected to a communication bus, such as a controller area network (CAN) bus 62, of the vehicle 26. The controller 60 may use information from the communication bus 62 to control the activation of the inflator 24. The inflator 24 may be connected to the controller 60, as shown in FIG. 9, or may be connected directly to the communication bus 62.

In operation, the deployable device 14 is in the undeployed position, as shown in FIGS. 1, 2A and 3A, under normal operating conditions of the vehicle 26. When the sensor senses an impact of the vehicle 26, the impact sensing system 56 triggers the inflator 24 to inflate the deployable device 14 with the inflation medium from the undeployed position to the deployed position. In particular, based on the type of impact sensed by the impact sensing system 56, the impact sensing system 56 inflates the deployable device 14 to the deployed position as shown in FIGS. 2B and 3B.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat back comprising:
   a frame;
   a deployable device including a back panel bonded to the frame, a front panel opposite the back panel, a cavity between the back panel and the front panel, and an intermediate portion extending from the back panel and the front panel;
   an inflator in communication with the cavity; and
   the back panel, front panel, and intermediate portion being formed of a plastic material.

2. The seat back as set forth in claim 1, wherein the back panel is welded to the frame.

3. The seat back as set forth in claim 1, wherein the back panel is adhered to the frame.

4. The seat back as set forth in claim 1, wherein the frame is formed of a plastic material.

5. The seat back as set forth in claim 4, wherein the back panel is welded to the frame.

6. The seat back as set forth in claim 1, wherein the intermediate portion includes a fold along the cavity between the front panel and the back panel.

7. The seat back as set forth in claim 6, wherein the fold is integral with at least one of the back panel and the front panel.

8. The seat back as set forth in claim 6, wherein the fold encloses the cavity between the front panel and the back panel.

9. The seat back as set forth in claim 1, wherein the inflator is disposed within the cavity.

10. The seat back as set forth in claim 9, wherein the inflator is mounted to the back panel.

11. The seat back as set forth in claim 1, wherein the inflator is mounted to the frame.

12. The seat back as set forth in claim 1, further comprising a housing fixed to the back panel in communication with the cavity, the inflator being disposed in the housing.

13. The seat back as set forth in claim 12, wherein the housing is integral with the back panel.

14. The seat back as set forth in claim 1, further comprising a clip fixed to the back panel and to the frame.

15. The seat back as set forth in claim 14, wherein the clip is integral with the back panel.

16. The seat back as set forth in claim 14, wherein the clip includes a hooked end engaging the frame.

17. The seat back as set forth in claim 1, wherein the thicknesses of the front panel is between 1-3 mm.

18. The seat back as set forth in claim 1, further comprising trim supported by the frame and defining a tear seam.

19. A seat back comprising:
   a frame;
   a deployable device including a back panel fixed to the frame, a front panel opposite the back panel, an intermediate portion extending between the back panel and the front panel, and a cavity between the back panel, the front panel, and the intermediate portion;
   an inflator in communication with the cavity; and
   the intermediate portion, the back panel, and the front panel being integral with each other.

20. A seat assembly comprising:
   a seat bottom;
   a seat back extending transverse to the seat bottom and having a frame;
   a deployable device including a back panel bonded to the frame, a front panel opposite the back panel, a cavity between the back panel and the front panel;
   an inflator in communication with the cavity; and
   the deployable device being formed of a plastic material.

* * * * *